United States Patent [19]

Adams et al.

[11] 4,257,621

[45] Mar. 24, 1981

[54] VEHICLE HITCH AND DRAWBAR ASSEMBLY

[75] Inventors: Carl P. Adams, Metamora; Robert D. Roley, Peoria, both of Ill.

[73] Assignee: Caterpillar Tractor Co., Peoria, Ill.

[21] Appl. No.: 10,339

[22] Filed: Feb. 8, 1979

[51] Int. Cl.³ .............................................. B60D 1/02
[52] U.S. Cl. ..................................... 280/495; 280/498
[58] Field of Search ........... 280/493, 492, 494, 490 R, 280/400, 405 R, 495–498, 499, 481, 501, 504, 515

[56] References Cited

U.S. PATENT DOCUMENTS

| | | | |
|---|---|---|---|
| 1,655,376 | 1/1928 | Lee | 280/498 X |
| 2,282,506 | 5/1942 | Wachter | 280/498 X |
| 2,440,877 | 5/1948 | Russell | 280/494 X |
| 2,886,344 | 5/1959 | Beach et al. | 280/494 X |
| 3,565,461 | 2/1971 | Jones | 280/498 X |
| 3,625,545 | 12/1971 | Somers | 280/490 R |
| 3,848,890 | 11/1974 | MacAlpine | 280/494 X |
| 3,907,333 | 9/1975 | Gianessi et al. | 280/481 X |

FOREIGN PATENT DOCUMENTS 507219 12/1954 Italy ......................................... 280/493

Primary Examiner—John A. Pekar
Attorney, Agent, or Firm—Wegner, Stellman, McCord, Wiles & Wood

[57] ABSTRACT

A hitch and drawbar assembly (10) arranged so that bolts (38) securing the hitch (17) to the drawbar (18) have substantially only tension forces applied thereto in transmitting a pulling force from the vehicle (11) to the hitch. The drawbar of the assembly is pivotally mounted to the frame (12) of the vehicle by suitable pins (15,16) and a support (21) is provided for retaining the drawbar in a desired, generally horizontal, slightly downwardly rearwardly inclined disposition. The support is arranged to permit slight movement of the drawbar longitudinally while maintaining the drawbar against pivotal movement so as to assure the transmission of pulling forces from the vehicle frame to the drawbar substantially solely through the pins. The drawbar may be thusly supported to a casing portion (20) of the vehicle as such mounting assures the prevention of transmission of pulling forces on the casing portion.

11 Claims, 4 Drawing Figures

VEHICLE HITCH AND DRAWBAR ASSEMBLY

TECHNICAL FIELD

This invention relates to vehicle structures and in particular to hitch and drawbar assemblies for use in vehicles, such as tractors.

BACKGROUND ART

It has been conventional in the design of hitch and drawbar assemblies for use with vehicles, such as tractors, to utilize brackets bolted to the frame of the vehicle and having means at the rearward end for attaching a clevis to which a hitch may be secured. The clevis is retained between a pair of longitudinally extending portions of the brackets extending in the longitudinal direction of the frame, i.e. in the direction of application of the pulling force. The clevis is secured to the drawbar brackets by a plurality of bolts which extend transversely to the longitudinal extent of the drawbar bracket portion and frame and, thus, which are in shear relative to the pulling forces generated in the use of the hitch and drawbar assembly. Thus, relatively large size bolts have conventionally been utilized for such securing means in such applications to accommodate the substantial shearing forces generated in the pulling operations of such tractors.

DISCLOSURE OF THE INVENTION

The present invention is directed to overcoming the problem as set forth above.

The present invention comprehends an improved vehicle structure having a hitch and drawbar assembly wherein the securing bolts are arranged to be placed substantially solely in tension by the pulling forces generated in the pulling operation.

In the illustrated embodiment, the drawbar includes a transverse portion to which the hitch is secured by the bolts.

The transverse portion of the drawbar may have a substantially vertical rear surface with the hitch defining a complementary surface facially engaging the drawbar surface in the connected arrangement. In the illustrated embodiment, the surfaces are substantially planar.

The drawbar effectively defines a U-shaped structure wherein the transverse securing portion defines the bight.

The drawbar may be supported at its forward end by suitable pins connected to the frame of the vehicle for transmitting pulling forces from the vehicle frame to the drawbar and attached hitch.

In the illustrated embodiment, the drawbar is supported in a generally horizontal position by a support connected to a casing portion of the vehicle. The support is arranged to effectively maintain the drawbar against pivotal movement on the pins while yet permitting slight movement of the drawbar relative to the casing to effectively preclude application of drawing forces to the casing and assure that substantially all drawing forces are directed from the frame through the pins and drawbar to the hitch, as discussed above.

In the illustrated embodiment, the drawbar is more specifically arranged at a slight downward rearward angle so as to dispose the bight, or connecting, portion of the drawbar lowermost. The rear surface of the drawbar may define a planar surface which is perpendicular to the longitudinal extent of the drawbar and, thus, inclined slightly to the vertical in the supported arrangement of the drawbar on the frame.

The hitch may include a securing portion defining a planar surface which is inclined to the longitudinal extent of the hitch at the same angle as the rear surface of the drawbar so that upon facial engagement between the hitch connecting portion surface and drawbar surface, the hitch will extend generally horizontally rearwardly from the drawbar notwithstanding the slight angular arrangement of the drawbar relative to the horizontal frame.

The drawbar and hitch assembly and means for mounting the same in a vehicle, such as a tractor, are extremely simple and economical of construction while yet providing an improved force transmitting means as discussed above.

BRIEF DESCRIPTION OF THE DRAWING

Other features and advantages of the invention will be apparent from the following description taken in connection with the accompanying drawing wherein.

BEST MODE FOR CARRYING OUT THE INVENTION

Figure 1:
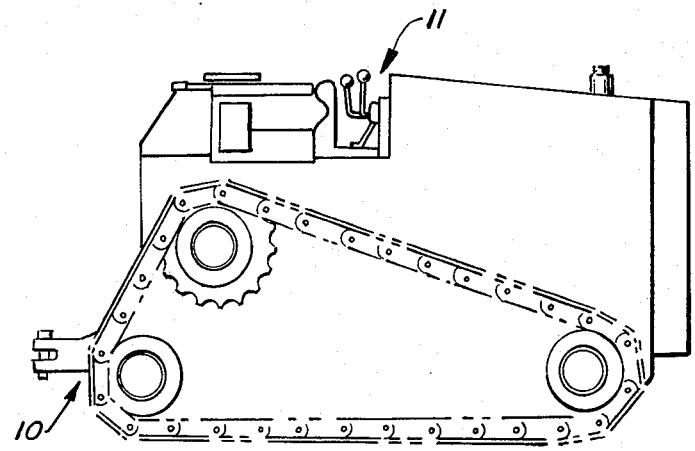
FIG. 1 is a side elevation of a vehicle provided with a hitch and drawbar assembly embodying the invention.
Figure 2:
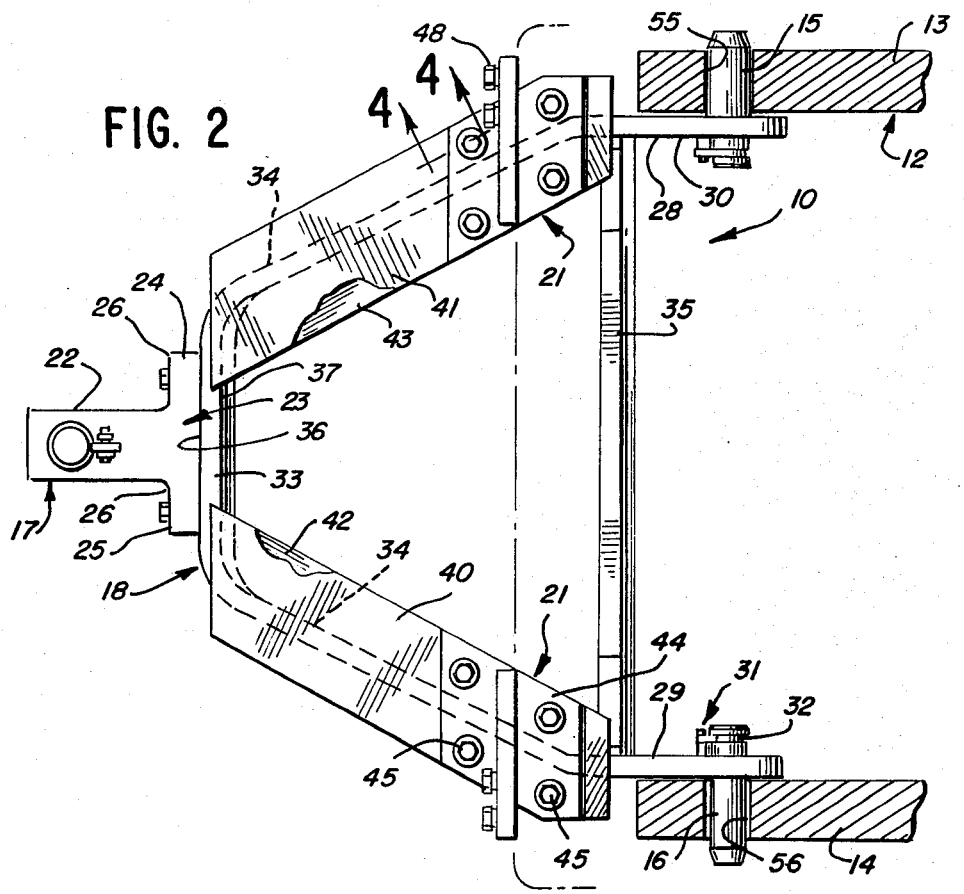
FIG. 2 is a fragmentary horizontal section of the vehicle illustrating in plan view the improved hitch and drawbar assembly.

In the exemplary embodiment of the invention as disclosed in the drawing, a hitch and drawbar assembly generally designated 10 is shown for use in a vertical, such as a tractor, generally designated 11 as in pulling loads from a frame portion generally designated 12 of the vehicle. As shown in FIG. 2, the frame may include a pair of longitudinally extending portions 13 and 14. The hitch and drawbar assembly 10 may be secured to the rear end of the frame portions 13 and 14 by suitable pivot pins 15 and 16 received in suitable openings 55 and 56 in the frame.

Figure 3:
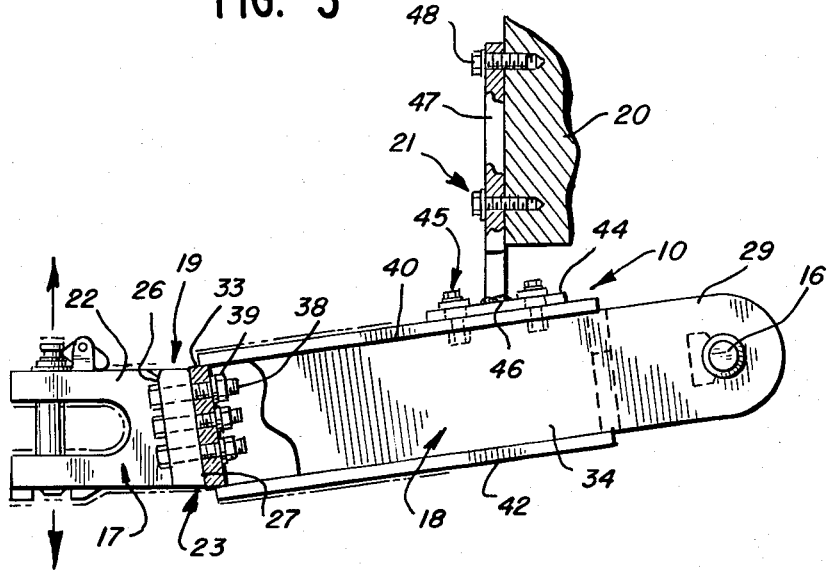
FIG. 3 is a fragmentary side elevation with portions broken away to facilitate illustration of the invention.

In the illustrated embodiment, the assembly includes a hitch 17 secured to a drawbar 18 by an improved securing means generally designated 19. As illustrated in FIG. 3, assembly 10 may be further supported to a casing portion 20 of the vehicle by an improved supporting means 21 so as to cause the drawbar to extend generally rearwardly downwardly at a small angle to the horizontal in the installed arrangement of the assembly 10 in the vehicle.

Hitch 17 includes a clevis portion 22 and a securing portion 23. In the illustrated embodiment, the securing portion is defined by a pair of outturned flange portions 24 and 25. The rear surface 26 of the flanges 24 and 25 is inclined at a small angle to the perpendicular to the longitudinal extent of the clevis portion 22, as shown in FIG. 3. The front surface 27 of the securing portion 23 is similarly inclined so as to be parallel to the rear surfaces 26.

Drawbar 18 is defined by a U-shaped bracket 28 having legs 29 and 30 spaced apart slightly less than the spacing of the frame portions 13 and 14 so as to be received therebetween. The pins 15 and 16 are mounted to the drawbar leg portions 29 and 30 and are retained against axial displacement therein by suitable locking members 31 received in suitable annular grooves 32 in the pins.

As shown in FIG. 2, the bight portion 33 of the drawbar is connected to the legs by angled connecting portions 34. A transverse reinforcing strut 35 extends between the legs 29 and 30 to provide a box frame reinforcement of the drawbar structure.

The rear, or outer, surface 36 of the drawbar bight portion 33 defines a planar surface perpendicular to the longitudinal extent of the drawbar as defined by the legs and connecting portions thereof. The inner, forward surface 37 of the bight 33 is parallel to surface 36 and, thus, defines a second planar surface perpendicular to the longitudinal extent of the drawbar. As seen in FIG. 2, surfaces 36 and 37 extend transversely to the longitudinal extent of the frame 12 and drawbar 18.

As indicated briefly above, the invention comprehends arranging the securing means 19 so as to place the securing means substantially solely in tension as a result of pulling forces being generated from the frame 12 to the hitch 17 in the normal pulling operation of the tractor vehicle. Thus, as shown in FIG. 3, the securing means 19 may include a plurality of bolts 38 extending perpendicular through the securing portion 23 of the hitch 17 and bight portion 33 of the drawbar 18, whereby the bight portion 33 effectively defines a connecting portion thereof. As further shown in FIG. 3, the bolts may be secured by suitable nuts 39 to provide a positive connection of the hitch to the drawbar with forces directed generally longitudinally of the drawbar being transmitted through the bolts 38 effectively soley as tension forces therein.

As best seen in FIGS. 2 and 3, drawbar 18 is further provided with a pair of upper plates 40 and 41 and a pair of lower plates 42 and 43. Plates 40–43 may be secured to the drawbar by suitable means, such as welding. The support means 21 includes a pair of structures mounted one each at opposite sides of the drawbar, as shown in FIG. 2. As illustrated in FIG. 3, each support means is defined by a lower plate 44 which may be secured to the drawbar upper plate 40 or 41 by suitable means, such as nut and bolt means 45.

Secured to plate 44 as by weld 46 is a second plate 47 which extends upwardly from plate 44 at a small angle to the perpendicular thereto. Plate 47 is arranged to be secured to the wall element defined by casing 20 by suitable means, such as screws 48. In the illustrated embodiment, the angular relationship of the plate 47 to plate 44 is similar to the angular relationship of surfaces 26 and 27 of the hitch securing portion 23 relative to the longitudinal extent of the hitch clevis portion 22 so that, as shown in FIG. 3, support means 21 supports the drawbar at the same slight angle to the horizontal whereby the hitch extends generally horizontally notwithstanding the small angular relationship of the drawbar to the horizontal.

As further indicated above, it is desirable to assure that the pulling forces generated by the vehicle are directed from the frame 12 to the drawbar and not from the casing 20 to the drawbar. To this end, bolts 45 are caused to extend through holes 49 in the drawbar plates 40 or 41 and suitable aligned holes 50 in the support means plate 44. Holes 50, as shown in FIG. 4, are enlarged so as to provide a loose fit relative to a thimble 51 coaxially carried on the shank 52 of the bolt 45 so that slight movement of the drawbar plates 40 and 41 may be accommodated without putting stress on the support means plate 44, thereby avoiding transmission of pulling forces to the casing 20, as discussed above.

Figure 4:
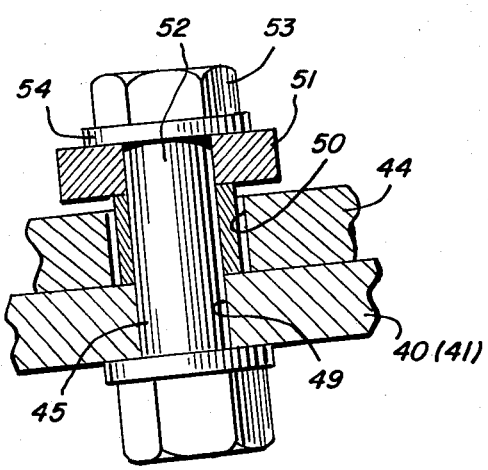
FIG. 4 is a fragmentary enlarged vertical section taken substantially along the line 4—4 of FIG. 2.

As shown in FIG. 4, the thimble 51 may be retained in place on the bolts 45 by a suitable nut 53 and washer 54 outwardly of the thimble on the bolt shank.

Thus, the support means 21 effectively supports the drawbar and hitch assembly in the desired disposition of FIG. 3 with the hitch 22 extending longitudinally generally horizontally and the drawbar extending downwardly and rearwardly at a small angle to the horizontal. The support means permits limited movement of the drawbar relative to the relatively weak support of the wall element 20 defined by the casing so as to avoid damage thereto as would result if substantial pulling forces were directed from the casing through the drawbar and hitch.

In the illustrated embodiment, the angular relationship of the drawbar to the horizontal and, thus, of the support means plate 47 to the vertical, is relatively small. Thus, the transmission of pulling forces through the bolts 38 provides effectively substantially only tensile forces in the bolts, thereby permitting the bolts to be of relatively small size while yet providing positive secured connection of the hitch to the drawbar notwithstanding the generation of substantial pulling forces in the operation of the tractor.

The drawbar and hitch assembly may be readily installed in the tractor by means of the removable pins 15 and 16 and the facilitated supporting of the assembly in the desired angular relationship by the bolts 48.

As indicated above, the hitch and drawbar assembly is extremely simple and economical of construction while yet providing facilitated installation and maintenance together with long troublefree life.

The foregoing disclosure of specific embodiments is illustrative of the broad inventive concepts comprehended by the invention.

What is claimed is:

1. A hitch and drawbar assembly (10) comprising:
    a drawbar (18) having a longitudinally extending mounting portion (28) for attachment to a vehicle (11) to transmit a longitudinal pulling force therethrough and a transversely extending connection portion (33);
    means (21) for supporting the drawbar in a vehicle with said mounting portion extending at a small angle to the horizontal with said mounting portion lowermost;
    a hitch (17) having a longitudinally extending clevis portion (22) and a securing portion (23) complementary to said drawbar connecting portion; and
    securing means (38) extending through said drawbar connecting portion and hitch securing portion in the direction of said longitudinal pulling force and at said small angle to the longitudinal extent of said clevis portion, said securing means securing the hitch to the drawbar to cause said securing means to be placed primarily in tension by the pulling force.

2. The hitch and drawbar assembly of claim 1 wherein said drawbar connecting portion (33) defines a generally vertical, slightly inclined rear surface (36) and said hitch securing portion (23) defines a complementary surface (27) facially engaging said drawbar rear surface.

3. The hitch and drawbar assembly of claim 1 wherein said drawbar mounting and connecting portions cooperatively define a U-shaped structure (28), said connecting portion (33) defining the bight of the U-shaped structure and having an outer abutment surface (36), said hitch securing portion (23) having an abutment surface (27) facially engaging said drawbar abutment surface.

4. The hitch and drawbar assembly of claim 1 wherein said drawbar mounting and connecting portions cooperatively define a U-shaped structure (28), said connecting portion (33) defining a bight of the U-shaped structure and having an outer abutment surface (36), and said hitch securing portion (23) having an abutment surface (27) facially engaging said drawbar abutment surface.

5. The hitch and drawbar assembly of claim 1 wherein said drawbar mounting and connecting portions cooperatively define a U-shaped structure (28), said connecting portion (33) defining the bight of the U-shaped structure and having an outer abutment surface (36), said hitch securing portion (23) having an abutment surface (27) facially engaging said drawbar abutment surface, said securing means defining bolts (48) extending longitudinally parallel to the mounting portion of said drawbar and at said small angle to the clevis portion of the hitch whereby the clevis portion extends longitudinally horizontally.

6. The hitch and drawbar assembly of claim 1 wherein said drawbar mounting and connecting portions cooperatively define a U-shaped structure (28), said connecting portion (33) defining the bight of the U-shaped structure and having an outer abutment surface (26) extending at a small angle to the vertical, said hitch securing portion having an abutment surface (27) facially engaging said drawbar abutment surface to dispose said clevis portion to extend longitudinally horizontally.

7. In a vehicle (11) having a frame (12) and a wall element (20) carried by the frame, an improved hitch and drawbar assembly (10) comprising:
    pin means (15,16) mounting a portion of the drawbar to the vehicle frame, said pin means defining a horizontal axis extending transverse to the frame; and
    support means (21) supporting the drawbar (18) on the wall element against pivoting about said pin means axis, said support means permitting limited relative movement between the drawbar and said support means radially of said pin means axis to cause substantially all longitudinal pulling forces developed in said drawbar in use of the assembly to be taken by said pin means, said support means further permitting limited relative movement between the drawbar and said support means at a small angle to a perpendicular to said permissible radial movement.

8. The vehicle structure of claim 7 wherein said support means (21) supports the drawbar to extend longitudinally at a small angle to the horizontal with a rear portion (36) of the drawbar for supporting a hitch (17) being disposed lowermost.

9. The vehicle structure of claim 7 wherein said support means (21) includes a first member (44) bolted to said drawbar and a second member (47) connected to said first member and fixedly secured to said wall element (20).

10. In a vehicle (11) having a frame (12) and a wall element (20) carried by the frame, an improved hitch and drawbar assembly (10) comprising:
    pin means (15,16) mounting a portion of the drawbar to the vehicle frame pivotally about a horizontal axis transverse to the frame;
    support means (21) supporting the drawbar (18) on the wall element against pivoting about said axis, said support means permitting limited relative movement between the drawbar and said support means to cause substantially longitudinally pulling forces developed in said drawbar in use of the assembly to be taken by said pin means;
    a hitch (17) having a securing portion (23);
    a drawbar (18) having a connecting portion (33); and
    means (38) securing said hitch securing portion to said drawbar connecting portion, said support means including plate means (44,46,47) secured to said wall element and bolts (45) securing said plate means to said drawbar (18), said plate means and drawbar defining aligned bolt holes (49,50) receiving said bolts, the bolt holes (50) in at least one of the plate means and drawer being oversize to permit limited longitudinal movement of the drawbar relative to said plate means.

11. The vehicle structure of claim 10 wherein said means (19) securing said hitch securing portion (23) to said drawbar connecting portion (33) comprises bolts (38) extending through said drawbar connecting portion and hitch securing portion in the direction of said longitudinal pulling force and securing the hitch to the drawbar to cause said last named bolts (38) to be placed substantially solely in tension by the pulling force.

* * * * *